United States Patent Office 3,069,405
Patented Dec. 18, 1962

3,069,405
PROCESS FOR MAKING POLYMERIC α-METHYL STYRENE HAVING A NARROW MOLECULAR WEIGHT DISTRIBUTION
Herbert W. McCormick and Ralph E. Friedrich, Midland, Mich., assignors to The Dow Chemical Company, Midland, Mich., a corporation of Delaware
No Drawing. Filed Aug. 20, 1958, Ser. No. 756,074
2 Claims. (Cl. 260—93.5)

This invention concerns a process for polymerizing α-methyl styrene to obtain a polymeric product composed of polymer molecules having a narrow molecular weight distribution. It relates more particularly to a process for polymerizing α-methyl styrene in an ether solvent in contact with an alkali metal-aromatic hydrocarbon complex polymerization catalyst.

It is known to polymerize vinyl compounds such as styrene, butadiene, isoprene and the like by contacting the same with an alkali metal addition compound of a polynuclear aromatic hydrocarbon while dissolved in an ether solvent. For example, U.S. Patent No. 2,327,082 polymerizes styrene by contacting the same with the addition compound prepared by reacting sodium metal with naphthalene in dimethyl ether of ethylene glycol.

It has now been found that alkali metal addition compounds of aromatic hydrocarbons are catalysts for the polymerization of α-methyl styrene in ether solutions to form polymers having a narrow molecular weight distribution.

It has further been discovered that the polymerization of α-methyl styrene in ether solutions is not only dependent upon the concentration of the monomer in the solution, but is also dependent upon the temperature as more fully hereinafter described.

According to the invention polymeric α-methyl styrene having a narrow molecular weight distribution can readily be prepared by a procedure which consists in contacting monomeric α-methyl styrene with an alkali metal addition compound of an aromatic hydrocarbon, e.g. sodium naphthalene complex or the sodium or potassium addition compound of α-methyl styrene, dissolved in an anhydrous or substantially anhydrous organic ether solvent at a temperature above the ceiling temperature for the polymerization of the α-methyl styrene, then cooling the mixture to a temperature below the ceiling temperature and allowing the polymerization reaction to proceed.

The term "ceiling temperature" employed herein means the temperature above which the polymerization of the α-methyl styrene does not proceed. The ceiling temperature is dependent upon the concentration of the monomeric α-methyl styrene in the reaction mixture and can be defined by the equation:

$$T_c = \frac{\Delta H}{\Delta S° + R \ln [m]}$$

wherein $T_c$ is the absolute temperature in degrees Kelvin, $\Delta H$ is the heat of polymerization which is $-6.96$ kilocalories per mole, $\Delta S°$ is the corresponding entropy value of $-24.8$ calories per mole, R is the gas constant and $m$ is the concentration of the α-methyl styrene in moles per liter of the solution. A method of determining the ceiling temperature for the polymerization of α-methyl styrene in tetrahydrofurane is described in J. Polymer Science, vol. 25, pages 488–490, September 1957. Upon placing the above values of $\Delta H$ and $\Delta S°$ in the equation and solving the latter, one finds that the ceiling temperature for the polymerization of α-methyl styrene at a given concentration in gram moles of the α-methyl styrene per liter of the ether solution is defined by the equation:

$$\frac{1}{T_c} = 0.00358 - 0.000661 \log [m]$$

Thus the ceiling temperature for the α-methyl styrene can readily be determined for any given concentration of the α-methyl styrene solution. Conversely, the temperature at which the polymerization will proceed can readily be known, it being a temperature lower than the ceiling temperature.

The alkali metal addition compounds to be employed as the polymerization catalyst can be a sodium, potassium, or lithium reaction product with an aromatic hydrocarbon such as naphthalene, diphenyl, anthracene, phenanthrene, stilbene, allylbenzene, α-methyl styrene and the like. The addition reaction compounds can be prepared by reaction of the alkali metal with the aromatic hydrocarbon in an ether solvent which is inert to the alkali metal and the alkali metal addition compound. Suitable ethers for preparing the addition compounds are dimethyl ether, methyl ethyl ether, methyl normal propyl ether, methyl isopropyl ether, dimethyl or diethyl ether of ethylene glycol or cyclic ethers such as dioxane, tetrahydrofurane or 2-methyl-tetrahydrofurane. Mixtures of any two or more of such ethers can also be used. Such ethers or mixtures thereof are suitable solvents for carrying out the polymerization of the α-methyl styrene as hereinafter described.

The formation of the alkali metal addition compounds is carried out by reacting the alkali metal with the aromatic hydrocarbon while dissolved in the ether solvent at temperatures between about 50 and $-70°$ C. and at atmospheric or superatmospheric pressure.

The proportion of the alkali metal addition compound to be employed in the reaction will vary depending upon the amount of the α-methyl styrene to be polymerized and the molecular weight of the polymeric product that is desired. The molecular weight of the polymer is directly proportional to the ratio of the alkali metal addition compound and the α-methyl styrene in the starting mixture. The proportion of the alkali metal addition compound to be employed in the reaction to obtain a polymer having a desired molecular weight can readily be determined from the equation:

$$\text{Mol. wt.} = \frac{118X}{y}$$

wherein X is the gram moles of α-methyl styrene in the polymer and $y$ is the gram atomic equivalents of alkali metal in the addition compound used. In general, an amount of the alkali metal addition compound corresponding to from $0.7 \times 10^{-3}$ to $1.3 \times 10^{-3}$ gram atomic equivalent of alkali metal in the addition compound per gram mole of the α-methyl styrene results in the formation of a polymeric product having an average molecular weight between about 90,000 and 150,000.

The α-methyl styrene to be polymerized should be pure or relatively pure, i.e. it should be free from substantial quantities of impurities incident to its manufacture, although the invention permits the use of α-methyl styrene having appreciable amounts of impurities incident to its manufacture.

In carrying out the polymerization reaction reasonable care should be exercised to keep the reactants and reaction mixture free from air, oxygen, carbon dioxide, water or water vapor or other materials which inhibit or kill the reaction.

In practice a charge of the α-methyl styrene together with a suitable ether solvent, e.g. tetrahydrofurane or dimethyl ether of ethylene glycol, is placed in a clean reaction vessel under a blanket or atmosphere of an inert gas such as nitrogen. The mixture is stirred and a solution of an alkali metal addition compound, suitably sodium naphthalene or sodium α-methyl styrene, in an inert ether which is the same as or different from the ether solvent and reaction medium employed with a α-methyl styrene, is added, preferably in small portions, while maintaining the resulting mixture at a temperature above the ceiling temperature for polymerization of the α-methyl styrene, e.g. at temperatures of from 5 to 50° C. above the ceiling temperature. The solution of the alkali metal addition compound is preferably added in small portions with stirring at a temperature above the ceiling temperature until the impurities in the reaction mixture are consumed by reaction with the alkali metal addition compound. This is easily determined since upon reaction of the impurities the solution undergoes a distinct color change which is readily observed. The color of the solution becomes a maroon to scarlet red. Thereafter, the alkali metal addition compound is added in the amount required to produce a polymer having the desired molecular weight, based on the weight of the α-methyl styrene initially used, while maintaining the mixture at a temperature above the ceiling temperature, i.e. the temperature above which the α-methyl styrene does not polymerize.

In an alternative procedure the α-methyl styrene can be analyzed, e.g. by titrating an aliquot portion with a solution of the alkali metal addition compound in the inert ether of known normality, and a quantity of the alkali metal addition compound added all at once at a temperature above the ceiling temperature in amount sufficient to react with the impurities in the α-methyl styrene starting material and sufficient to subsequently initiate the polymerization of the α-methyl styrene upon cooling the mixture to a temperature below the ceiling temperature.

Upon reacting the impurities in the mixture, which are usually those incident to the manufacture of the α-methyl styrene, the alkali metal addition complex and the ether solvent, the mixture containing the alkali addition compound as polymerization catalyst is cooled to a temperature below the ceiling temperature and the polymerization of the α-methyl styrene is allowed to proceed. The polymerization can be continued until all or substantially all of the α-methyl styrene is polymerized, which is the preferred mode of operation, or the polymerization can be discontinued before completion, as desired.

It may be mentioned that the ceiling temperature becomes lower as the concentration of the monomeric α-methyl styrene in the reaction mixture decreases because of its being consumed in the formation of polymer so that the temperature must correspondingly be lowered from that at which polymerization was initiated in order to complete the polymerization when a gradual cooling of the mixture to a temperature below the ceiling temperature is employed. The mixture can be cooled rapidly or gradually as desired. In general, cooling of the mixture to a temperature of about −75° C. permits substantially complete polymerization of the α-methyl styrene. If the mixture is cooled to a temperature that does not permit all of the α-methyl styrene to polymerize, the polymerization proceeds until the concentration of the monomeric α-methyl styrene in the mixture corresponds to a ceiling temperature defined by the aforesaid equation and then stops. Conversely, if the mixture is cooled to a temperature such that substantially all of the α-methyl styrene is polymerized, then is warmed to a temperature corresponding to a ceiling temperature that the mixtures would have when say one-half of the α-methyl styrene in the starting mixture is polymerized, the polymer will depolymerize to form monomeric α-methyl styrene in a concentration corresponding to that given by the said equation for determining the ceiling temperature, provided that the polymer is not killed. The polymer is a "living" polymer and undergoes polymerization and depolymerization depending upon the temperature of the mixture to equilibrate the monomer concentration with the temperature in accordance with the equation given.

The reaction is discontinued by adding air, carbon dioxide, oxygen or water, preferably the latter, to the mixture after which the polymer is recovered from the solution in usual ways, e.g. by heating the solution to distill the solvent from the polymer. The product is obtained as polymeric molecules having a narrow molecular weight distribution which molecular weight appears to be independent of the temperature of polymerization and dependent for the most part upon the ratio of the alkali metal addition compound to the monomeric α-methyl styrene, i.e. upon the concentration of the alkali metal addition compound in the α-methyl styrene initially used.

The process can be carried out batchwise or in continuous manner. Advantageously, the process allows impurities in the reactants and reaction medium to be removed or prevented from interfering with the polymerization reaction prior to carrying out the polymerization of the α-methyl styrene and thereby results in the formation of a polymer of uniform molecular weight and in better control of the polymerization.

The following examples illustrate ways in which the principle of the invention has been applied, but are not to be construed as limiting its scope.

*Example 1*

A charge of 2500 ml. of pure dry tetrahydrofurane as solvent medium was placed in a clean glass reaction vessel equipped with a stirrer and maintained under an atmosphere of nitrogen. A charge of 500 ml. of pure dry α-methyl styrene was added. The mixture was stirred and heated to a temperature of 45° C. The ceiling temperature of the mixture was 11° C. Thereafter, a 0.4-normal solution of sodium naphthalene complex in tetrahydrofurane was added dropwise until the resulting mixture developed a bright red color, then 18 ml. more of the sodium naphthalene complex were added. The resulting mixture was slowly cooled to a temperature of −60° C. over a period of one hour and maintained at −60° C. with stirring for a period of 2 hours longer to polymerize the α-methyl styrene. Thereafter, a few drops of oxygen free water were added to terminate the polymerization reaction. The polymer was recovered by evaporating the tetrahydrofurane solvent by heating the solution under subatmospheric pressure until the residue was at a temperature of 175° C. at 5 millimeters absolute pressure. There was obtained 445 grams of polymer. The product was a hard brittle solid at room temperature. The polymeric product had a molecular weight of 120,000 as determined by the scattering of light and was composed of polymer molecules having a narrow molecular weight distribution. The theoretical molecular weight of the polymer was 125,000, calculated from the equation:

$$\text{Mol. wt.} = \frac{118X}{y}$$

wherein $X$ is the gram moles of α-methyl styrene in the polymer and $y$ is the gram atomic weights of alkali metal in the alkali metal addition compound used as catalyst. The molecular weight distribution of the polymer was determined by dissolving a portion of the polymeric α-methyl styrene in cyclohexane to form a solution containing 0.2 percent by weight of the polymer, place the solution in a cell in an ultracentrifuge and subject the solution to sedimentation by rotating the ultracentrifuge at 59,780 r.p.m. The sedimentation was followed by recording the change in refractive index gradient of the solution photographically by schlieren optics every 16 minutes. Plotting the refractive index gradient values against the distance from the axis of rotation and drawing a smooth curve through the points gives a sedimentation diagram. From the sedimentation diagram, values were selected for the change in refractive index gradient at various distances from the axis of rotation. These values were used to calculate the distribution of sedimentation constants which are proportional to the molecular weight distribution of the polymer molecules, by a procedure similar to that described by Baldwin, J. Am. Chem. Soc., vol. 72, page 4325 (1950). The values for the distribution of sedimentation constants were plotted against the sedimentation constant values to obtain a curve showing the molecular weight distribution of the polymer. The half-width is defined as the area under the curve divided by the height. The greater the half-width the greater is the molecular weight distribution of the polymer. The polymeric α-methyl styrene obtained in the experiment had a molecular weight distribution corresponding to a half-width of 0.667.

Example 2

A charge of 335 ml. of monomeric α-methyl styrene and 350 ml. of tetrahydrofurane as solvent and reaction medium was placed in a glass reaction vessel equipped with a stirrer and maintained under an atmosphere of nitrogen gas at a temperature of 60° C. A 0.49 normal solution of sodium-naphthalene, prepared by reacting sodium with naphthalene in tetrahydrofurane, was added dropwise with stirring until the impurities in the mixture were consumed. This was observed by the solution changing to a bright red color. Thereafter, a further quantity of 3.6 ml. of the sodium-naphthalene solution was added as catalyst for the polymerization. The resulting mixture was then cooled to a temperature of 25° C., and below the ceiling temperature of the mixture of the starting materials, and the polymerization was allowed to continue for a time of 2 hours until equilibrated. Thereafter, a few drops of oxygen-free water were added to terminate the polymerization reaction. The polymer was recovered by pouring the reacted mixture into methyl alcohol to precipitate the polymer. The polymer was separated, washed and devolatilized by heating the same in a vacuum oven at a temperature of 75° C. at 1 millimeter absolute pressure for 5 hours.

There was obtained 115 grams of polymer. The polymer had a viscosity characteristic of 5.4 centipoises determined on a 10 weight percent solution of the polymer in toluene at 25° C. The half-width value for the polymer was 0.688. It was composed of polymer molecules of narrow molecular weight distribution. The yield of said polymer was 38 percent based on the α-methyl styrene initially used. This corresponds to a yield of 90 percent of the polymer theoretically possible to obtain at a polymerization temperature of 25° C. for the mixture of starting materials.

Example 3

A charge of 120 milliliters of dimethyl ether of ethylene glycol and 30 milliliters of α-methyl styrene were placed in a glass reaction vessel equipped with a stirrer and maintained under a blanket of nitrogen gas at a temperature of 50° C. A 0.4 normal solution of sodium-diphenyl addition compound, prepared by reacting sodium with diphenyl in dimethyl ether of ethylene glycol, was added dropwise until the color of the solution turned a bright red. Thereafter, 1.4 milliliters more of the solution was added as polymerization catalyst. The resulting mixture was cooled to −75° C. and the polymerization was allowed to proceed. The polymerization was substantially completed in a period of 10 minutes. A few drops of oxygen free water were added to the mixture to terminate the polymerization. The polymer was recovered by precipitation in methyl alcohol and was washed and dried. There was obtained 25.8 grams of polymer. The yield of polymer was 95 percent. The polymer had a viscosity characteristic of 4 centipoises, and a half-width value of 0.896. The product was homopolymer of α-methyl styrene having a narrow molecular weight distribution.

Example 4

A charge of 650 milliliters of tetrahydrofurane and 163 milliliters of α-methyl styrene were placed in a glass reaction vessel equipped with a stirrer. A 0.68 normal solution of lithium-naphthalene addition compound in tetrahydrofurane was added with stirring at a temperature of 35° C. until the mixture turned a bright red color. Thereafter, 3.7 milliliters more of the solution was added as polymerization catalyst. The resulting mixture was cooled to a temperature of −75° C. and the polymerization reaction allowed to proceed. The polymerization was terminated after a reaction time of 20 minutes and the polymer recovered. There was obtained 143 grams of polymeric α-methyl styrene. The yield of said product was 96.8 percent. The polymer had a viscosity characteristic of 6.5 centipoises and a half-width value of 0.463. It was a polymer of narrow molecular weight distribution.

Example 5

A charge of 2000 milliliters of tetrahydrofurane and 500 milliliters of α-methyl styrene were placed in a glass reaction vessel equipped with a stirrer. A 0.25 normal solution of sodium-α-methyl styrene addition compound, prepared by reacting sodium with α-methyl sytrene in tetrahydrofurane at a temperature above the ceiling temperature, was added until the mixture turned a bright red color. Thereafter, 15 milliliters more of the solution was added as polymerization catalyst. The resulting mixture was cooled to −60° C. and the polymerization allowed to proceed. The polymerization was terminated after a reaction time of one hour at −60° C. and the polymer was recovered. There was obtained 440 grams of product. The yield was 97.2 percent. The polymer had a viscosity characteristic of 16 centipoises, and a half-width value of 0.276. The product was poly-α-methyl styrene of narrow molecular weight distribution. It could be molded to form clear plastic articles such as plates, bars, rods, boxes, toys, combs, etc., useful for a variety of purposes.

We claim:

1. In a process for polymerizing α-methyl styrene in an ether solvent in admixture with an addition compound of an alkali metal and an aromatic hydrocarbon, prepared by reaction of the alkali metal with the aromatic hydrocarbon in an ether solvent which is inert to the alkali metal and the alkali metal addition compound, as polymerization catalyst the improvement which consists in mixing the α-methyl styrene with the catalyst in an inert ether solvent at a temperature above the ceiling temperature for the polymerization of the α-methyl styrene defined by the equation $$\frac{1}{T_c} = 0.00358 - 0.000661 \log [m]$$

wherein in $T_c$ in the absolute temperature in degrees Kelvin and $m$ is the concentration of the α-methyl styrene in gram moles per liter of the ether solvent, then cooling the mixture to a temperature sufficient to result in the polymerization of at least one-third of the monomer below the ceiling temperature and allowing the polymerization to proceed.

2. In a process for polymerizing α-methyl styrene in an ether solvent in admixture with an addition compound of an alkali metal and an aromatic hydrocarbon, prepared by reaction of the alkali metal with the aromatic hydrocarbon in an ether solvent which is inert to the alkali metal and the alkali metal addition compound, as polymerization catalyst the improvement which consists in mixing the α-methyl styrene with the catalyst in an inert ether solvent at a temperature above the ceiling temperature for the polymerization of the α-methyl styrene defined by the equation $$\frac{1}{T_c} = 0.00358 - 0.000661 \log [m]$$

wherein $T_c$ is the absolute temperature in degrees Kelvin and $m$ is the concentration of the α-methyl styrene in gram moles per liter of the ether solvent, said alkali metal addition compound being employed in amount sufficient to react with impurities in the α-methyl styrene incident to its manufacture and to provide from $0.7 \times 10^{-3}$ to $1.3 \times 10^{-3}$ gram atomic equivalent of the alkali metal in the addition compound per gram mole of the α-methyl styrene to subsequently initiate polymerization of the α-methyl styrene, reacting the alkali metal addition compound with said impurities at a temperature above the ceiling temperature, then cooling the mixture to a temperature below the ceiling temperature sufficient to polymerize the monomer and allowing the polymerization to proceed until the α-methyl styrene is substantially polymerized.

References Cited in the file of this patent

UNITED STATES PATENTS

| | | |
|---|---|---|
| 2,146,447 | Scott | Feb. 7, 1939 |
| 2,327,082 | Walker | Aug. 17, 1943 |
| 2,448,976 | Heiligmann | Sept. 7, 1948 |

OTHER REFERENCES

Morton et al.: J.A.C.S., vol. 74, pages 5434–40 (only 5434 and 5440 relied on), November 1952.

McCormick: Journal of Polymer Science, vol. 25, pages 488–490, September 1957.

Worsfold et al.: Journal of Polymer Science, vol. 26, pages 299–304, December 1957.